United States Patent
Klein et al.

(10) Patent No.: US 8,504,990 B2
(45) Date of Patent: Aug. 6, 2013

(54) MIDDLEWARE CONFIGURATION PROCESSES

(75) Inventors: Udo Klein, Eisenbahnstrasse (DE); Harald Hengelbrock, Shanghai (CN)

(73) Assignee: SAP AG, Walldorf (DE)

( * ) Notice: Subject to any disclaimer, the term of this patent is extended or adjusted under 35 U.S.C. 154(b) by 340 days.

(21) Appl. No.: 12/871,732

(22) Filed: Aug. 30, 2010

(65) Prior Publication Data

US 2012/0054720 A1 Mar. 1, 2012

(51) Int. Cl.
*G06F 9/44* (2006.01)

(52) U.S. Cl.
USPC ........... 717/125; 717/173; 717/118; 707/803; 707/781; 714/4.1; 714/37

(58) Field of Classification Search
USPC .... 717/125, 173, 118; 707/803, 781; 714/4.1, 714/37, E11.073
See application file for complete search history.

(56) References Cited

U.S. PATENT DOCUMENTS

| | | | |
|---|---|---|---|
| 6,735,593 B1 * | 5/2004 | Williams | 1/1 |
| 2012/0023187 A1 * | 1/2012 | Pohlmann et al. | 709/213 |
| 2012/0030168 A1 * | 2/2012 | Weissenberger et al. | 707/611 |
| 2012/0030502 A1 * | 2/2012 | Rueegg et al. | 714/4.1 |
| 2012/0030666 A1 * | 2/2012 | Laicher et al. | 717/173 |
| 2012/0047139 A1 * | 2/2012 | Fitzer et al. | 707/737 |

* cited by examiner

*Primary Examiner* — Vanel Frenel
(74) *Attorney, Agent, or Firm* — Mintz Levin Cohn Ferris Glovsky and Popeo, P.C.

(57) ABSTRACT

An improved middleware configuration process can include extracting parameters of a manually configured customized software instance to be implemented on a tenant that provides the customized software instance providing business process-specific support tailored to a specific organization. A configuration engine can perform the extracting and can receive a designation of a first part of the parameters as relating to tenant-independent content of the customized software instance and a second part of the parameters as relating to tenant-dependent content of the customized software instance. The tenant-independent content can relate to features of a core software platform, and the tenant-dependent content can relate to at least one organization-specific extension of the core software platform that provides the business process-specific support. The tenant-dependent content can have tenant-specific content formats and tenant-specific content data defined by and available to only the tenant. The tenant-independent content of the tenant can be modified according to the first part, and the tenant-specific content can be modified according to tenant-specific implementation input that implements the second part for the tenant in accordance with the customized software instance. Related systems, methods, and articles of manufacture are also described.

20 Claims, 7 Drawing Sheets

MIDDLEWARE CONFIGURATION PROCESSES

TECHNICAL FIELD

The subject matter described herein relates to improved automation of middleware configuration processes, for example for customized software solutions.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a typical development process for such applications, a developer might enter a desired technical configuration into a spreadsheet or other file that is then sent to content developers who create a complete version of the configuration based on the technical configuration. The desired technical configuration, which describes the desired features of a new configuration of a software solution, can be designed using an enterprise modeling tool, such as for example the ARIS™ platform (available from IDS Scheer AG of Saarbücken, Germany). Such an enterprise modeling tool can be used to develop a business process model that represents business tasks and processes use in the conduct of the business of an organization.

The business process model is then generally converted to an executable, active implementation, for example using a service-oriented application and integration platform, such as SAP NetWeaver™ (available from SAP AG of Walldorf, Germany). A service-oriented application and integration platform can provide development and runtime environments for a core software platform as well as capabilities for developing customized solutions and integrating the core software platform and/or the customized solution with other applications and systems such as those provided by third party service providers.

A service-oriented application and integration platform can provide built-in governance features that enable a developer, administrator, or other information technology (it) professional to achieve a consistent design of services, processes, and events across the business processes of an organization or enterprise. With tools delivered through the ES Repository, IT professionals can model metadata, reuse standard data types, and harmonize service signatures to ensure that services are well designed, consistent, of high quality, fully-described, and available for use at runtime. IT organizations can also define and manage access rights to control who has the ability to create, change, view, or delete service metadata. Finally, as the number of published enterprise services increases, IT professionals can use repository tools to combine, reassemble, or delete services to ensure effective and high-quality reuse.

A database, such as for example an enterprise services repository (ESR), can store the definitions and metadata of enterprise services for an organization based on the execution terms of the completed configuration generated using the service-oriented application and integration platform. In this manner, an integrated modeling environment can be provided for defining enterprise services, data types, and other design objects for service oriented architecture-based business processes in a standards-compliant manner. The ESR can store modeling data relating to an organization's business process, including relevant interfaces, data types, and mappings for message exchange between different software components and applications that are used in configuring and running needed business processes in an organization-specific system landscape.

Using this approach, however, can lead to several difficulties, including but not limited to a heightened potential for transcription errors in transferring the technical configuration defined in the business process model from the enterprise modeling tool to the service-oriented application and integration platform that completes the configuration to provide the integrated business process solution. The process of enterprise modeling using one tool followed by development of the interfaces, associations, dependencies, and the like necessary to generate an integrated, customized solution that is end user ready using second tool is also time consuming and highly redundant. An improved approach is desirable.

SUMMARY

In one aspect, a computer-implemented method includes extracting, by a configuration engine of a software development platform from a modeling engine, parameters of a manually configured customized software instance to be implemented on a tenant that provides the customized software instance providing business process-specific support tailored to a specific organization. The tenant is hosted on a computing system including one or more programmable processors and is accessible for use by members of the specific organization. The configuration engine receives a designation of a first part of the parameters as relating to tenant-independent content of the customized software instance and a second part of the parameters as relating to tenant-dependent content of the customized software instance. The tenant-independent content relates to features of a core software platform and the tenant-dependent content relates to at least one organization-specific extension of the core software platform that provides the business process-specific support. The tenant-dependent content includes tenant-specific content formats and tenant-specific content data defined by and available to only the tenant. The tenant-independent content of the tenant is modified according to the first part, and the tenant-specific content is modified according to tenant-specific implementation input that implements the second part for the tenant in accordance with the customized software instance. The customized software solution is provided for use by end users at the organization.

In some variations, one or more of the following can optionally be included. A feature of the customized software instance that is manually configured by the developer can be received via a user interface provided at a developer's machine. A consistency check can be preformed on the feature before extracting the parameters by the configuration engine. The consistency check can test suitability of the parameters with the core software platform and with existing tenant-dependent content of the tenant. The tenant-specific implementation input can include dependency information identifying a first item of tenant-independent content upon which a second item of tenant-specific content has a dependency. A refined model of modeling entities for the customized software instance can be created in an enterprise services repository, and programming language proxies of the modeling entities can be created for implementation in the customized software instance. The modeling engine and configuration engine can be implemented on either a single development platform that includes one or more processors or on separate development platforms in communication over a network.

The tenant can be provided by a multi-tenant software architecture providing access to a plurality of tenants that includes the tenant. The multi-tenant software architecture can include an application server providing access for each of a plurality of organizations to at least one organization-specific tenant of the plurality of tenants and a data repository comprising the tenant-independent content that is common to all of the plurality of tenants and tenant-specific content for each of the plurality of organization. The tenant-specific content for each of the plurality of tenants can be accessible to and modifiable by only a corresponding organization of the plurality of organizations. The tenant-independent content can include at least one of core software platform content that represents core functionality of a core software platform upon which the manually configured customized software instance is based, and system content that is created by the runtime of the core software platform. The core software platform content can be not modifiable by a tenant. The system content can include a core data object that is modifiable with data provided by the tenant during runtime.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many potential advantages. For example, configuration errors and other mistakes in development and roll-out of new features for a core software platform on a multi-tenant architecture can be substantially reduced. The starting point for a roll-out of new features or even a new platform can be an existing, fully functional configuration instead of a feature list or other unimplemented plan. Additionally, the involvement of fewer parties in the configuration process can lead to improved efficiency and minimization of opportunities for errors to arise. The overall turnaround time from conceiving a configuration to having it ready for productive use can be greatly reduced as well, in some cases from several months to a week or less.

It should be noted that, while the descriptions of specific implementations of the current subject matter may discuss delivery of enterprise resource planning software one or more organizations, in some implementations via a multi-tenant system, the current subject matter is applicable to other types of software and data services access as well. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
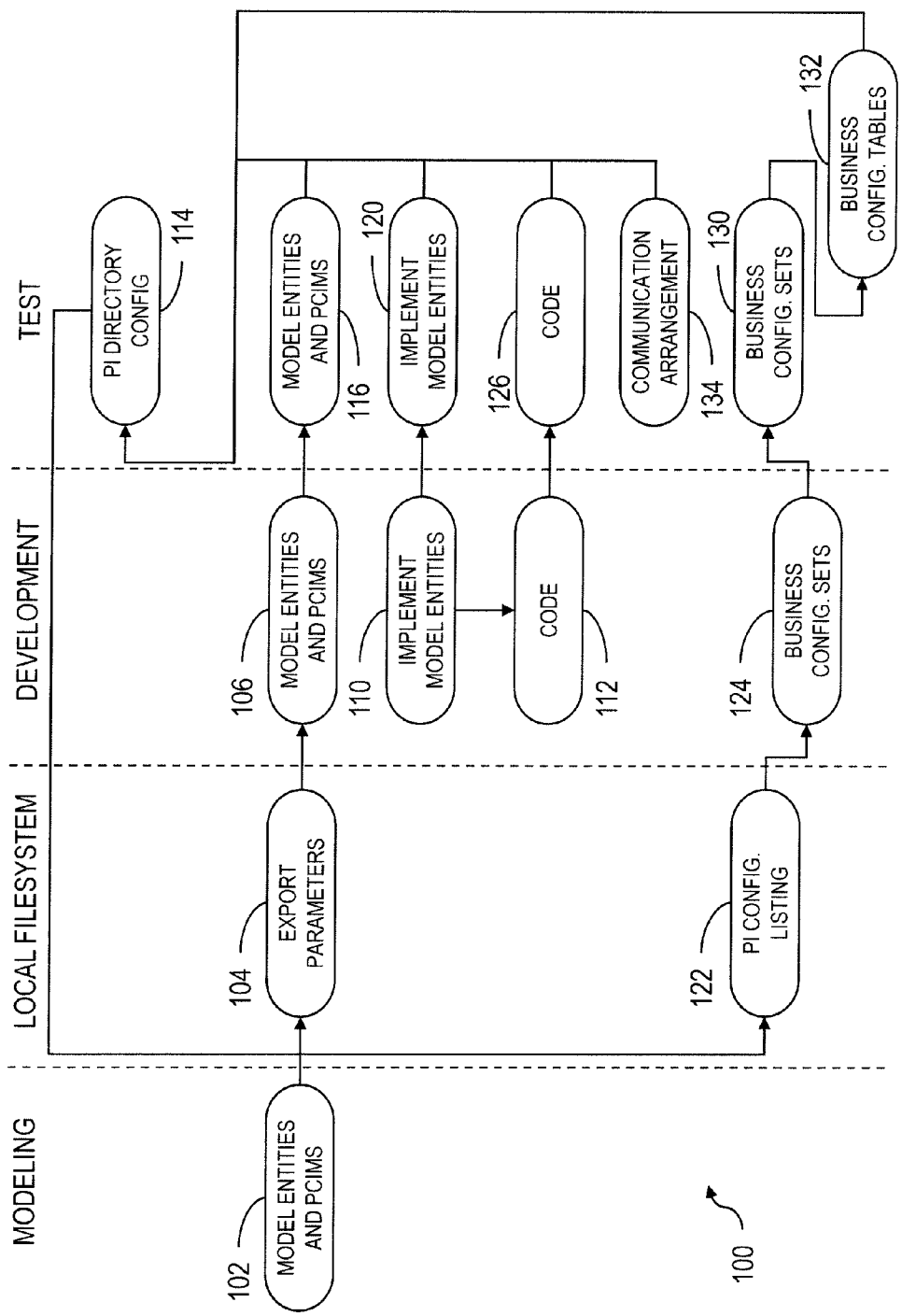
FIG. 1 is a process flow chart illustrating an approach to developing a customized software platform.
Figure 2:
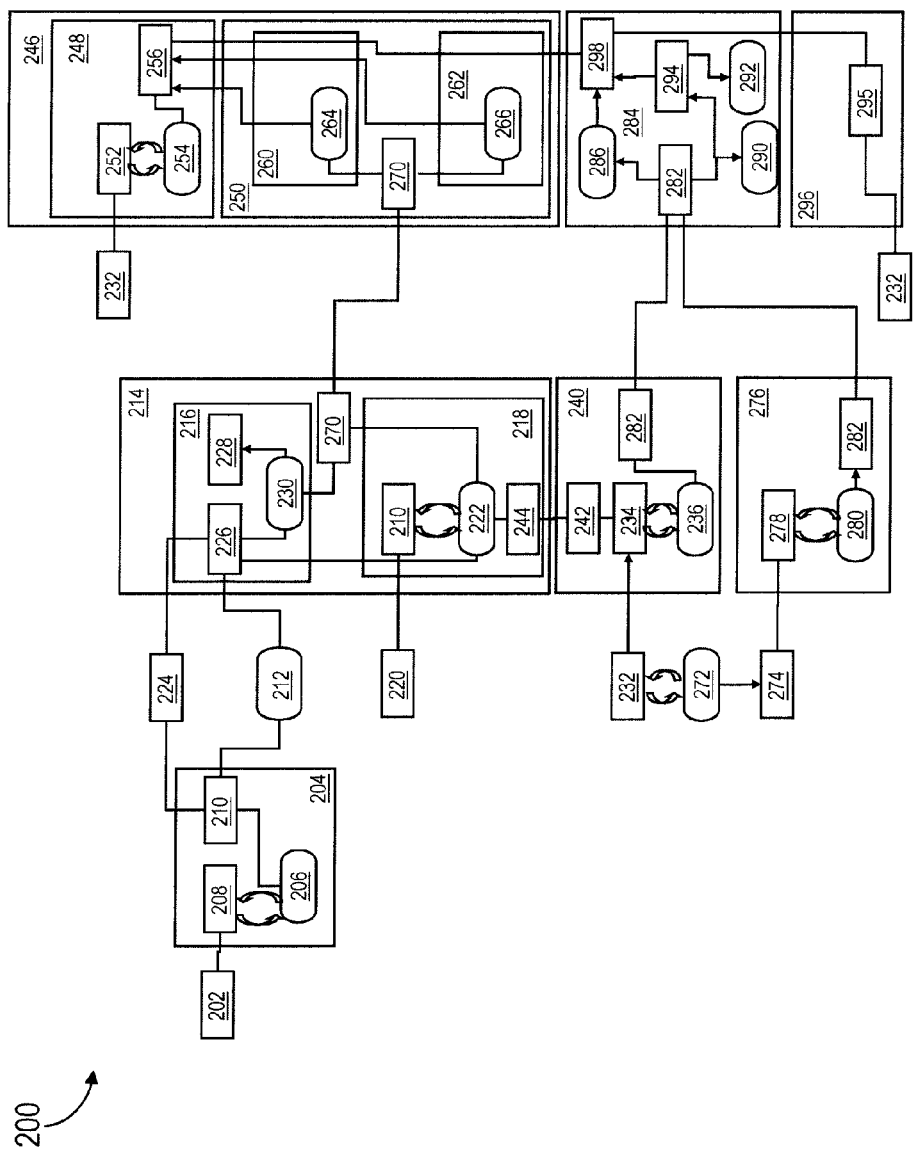
FIG. 2 is a diagram showing components and features of a system for developing a customized software platform.

FIG. 1 shows a development flow chart 100 illustrating an example of an existing development process for a customized software platform in reference to the box diagram 200 shown in FIG. 2. In this example, a first expert 202 proficient at the use of a first instance of a business process modeling tool 204 can at 102 generate a first version of a model 206 that maintains global data types (GDTs), data structures, business objects related to various business processes of an organization, interfaces, process component interaction models (PCIMs), and the like subject to process integration component (PIC) governance. The maintaining can be performed via a business process modeling tool user interface 208 of the first instance of the business process modeling tool 204 to model entities, PCIMs, and the like required for execution of organization-specific business processes of an organization for which the customized software platform is being developed. Upon completion of the modeling tasks, a file 210 listing parameters of the first version of the model 206 is exported at to a local filesystem 212 at 104.

At a central development system 214 that includes both a central instance of the business process modeling tool 216 and an enterprise services repository 218, a second developer expert 220 can at 106 maintain a first development version 222 of the model entities, PCIMs, etc., thereby duplicating one or more tasks of the first expert in maintaining global data types (GDTs), data structures, business objects related to various business processes of an organization, interfaces, process component interaction models (PCIMs), and the like subject to process integration component (PIC) governance. Typically, the first development version of the model 222 includes additional metadata relative to the first version of the model 206.

An additional step that can be performed either by one of the experts or alternatively by a third expert 224 can include periodic use of specific reports to load entities created in the first instance of the business process modeling tool 204 into the central instance of the business process modeling tool 216. In an example, the file 210 can be read from the local file system 212 via a file import interface 228. The third expert 224 or some other trained operator can create ESI links that enable various web services and other features of the organization's business processes into a second development version of the business process model 230 at 110 to implement model entities and the like in accordance with the first version of the model 206. Because these links are typically created manually, errors in entering them can lead to broken links that may not be detected until much later in the development process when they are more difficult to identify and correct.

A developer 232 creates and implements proxies 234, for example for business objects and agents. At 112, these proxies, as well as web links and the like can be implemented in code 236 at a coding platform 240, for example in a language that provides a model for describing web services, such as for example the XML-based web services description language (WSDL). The coding can be uploaded 242 for subsequent download 244 at the enterprise services repository 218. The process of creating and implementing the proxies 234 is generally accomplished in a "pull" manner in that changes to the model created in the ESR 218 are not automatically reflected. However, errors in coding these proxies and links can be quite problematic at runtime and even at system validation.

The developer 232, or alternatively another developer, can also work in parallel on a test version of the system 246 that includes a process integration (PI) directory 248 and an integrated test platform 250 to configure an exchange infrastructure directory user interface 252 and to create a PI configuration 254 for a PI directory application programming interface (API) 256 at 114. The integrated test platform 250 can include test instances of a business process modeling tool 260 and an enterprise services repository 262. At 116 a test copy 264 of the model entities and PCIMs of the first development version of the business process model 230 is implemented in the test instance of the business process modeling tool 260, and at 120 a test copy 266 of the implementation model entities of the first development version of the model 222. The copies of the first development version of the model 222 and the second development version of the model 230 can be exchanged between the development system 214 and the PI directory test system 244 by a content management system (CMS) 270 on each respective system.

At 122, a listing 272 of the object definitions and other parameters of the PI configuration 254 can be passed from the developer 232 based on the PI configuration 254 implemented on the PI directory test system 246 to a business configuration developer 274 who operates a development version 276 of the core software platform upon which the modeled business processes are to be implemented. Design time definitions 278 of the business configuration can be prepared and at 124 business configuration sets 280 are prepared based on the listing 272 of the object definitions and other parameters of the PI configuration 254. These business configuration sets as well as the coding 236 prepared on the coding platform 240 can be passed via transport protocols 282 to a test system 284 as a test version of the coding 286 at 126 and a test version of the business configuration sets 288 at 130. Because the test system 284 is fully scoped, the test version of the business configuration sets can be automatically deployed to business configuration tables 292 by an auto-deployer 294.

The developer 232 or another developer can create any necessary communication arrangement user interface modifications 295 in a test version 296 of the core software platform upon which the modeled business processes are to be implemented. The communication arrangement user interface modifications 295, deployed business configuration tables 292, and test version of the coding 286 can be combined into a communication arrangement business object 298 that is accessed by the PI directory application programming interface (API) 256 to provide the core user interface and functionality of the customized software platform. Once these operations are completed, additional roll-out can occur on a customer's productive system. Because of the large number of interactions required between model development, development and test systems, coders, and developers, the process as illustrated in FIG. 1 and FIG. 2 can be quite cumbersome and highly prone to errors that may not reveal themselves fully until they are implemented on the test systems or even on the customer's productive system. Aspects of the current subject matter provide an improved and streamlined process for customized software development.

Figure 3:
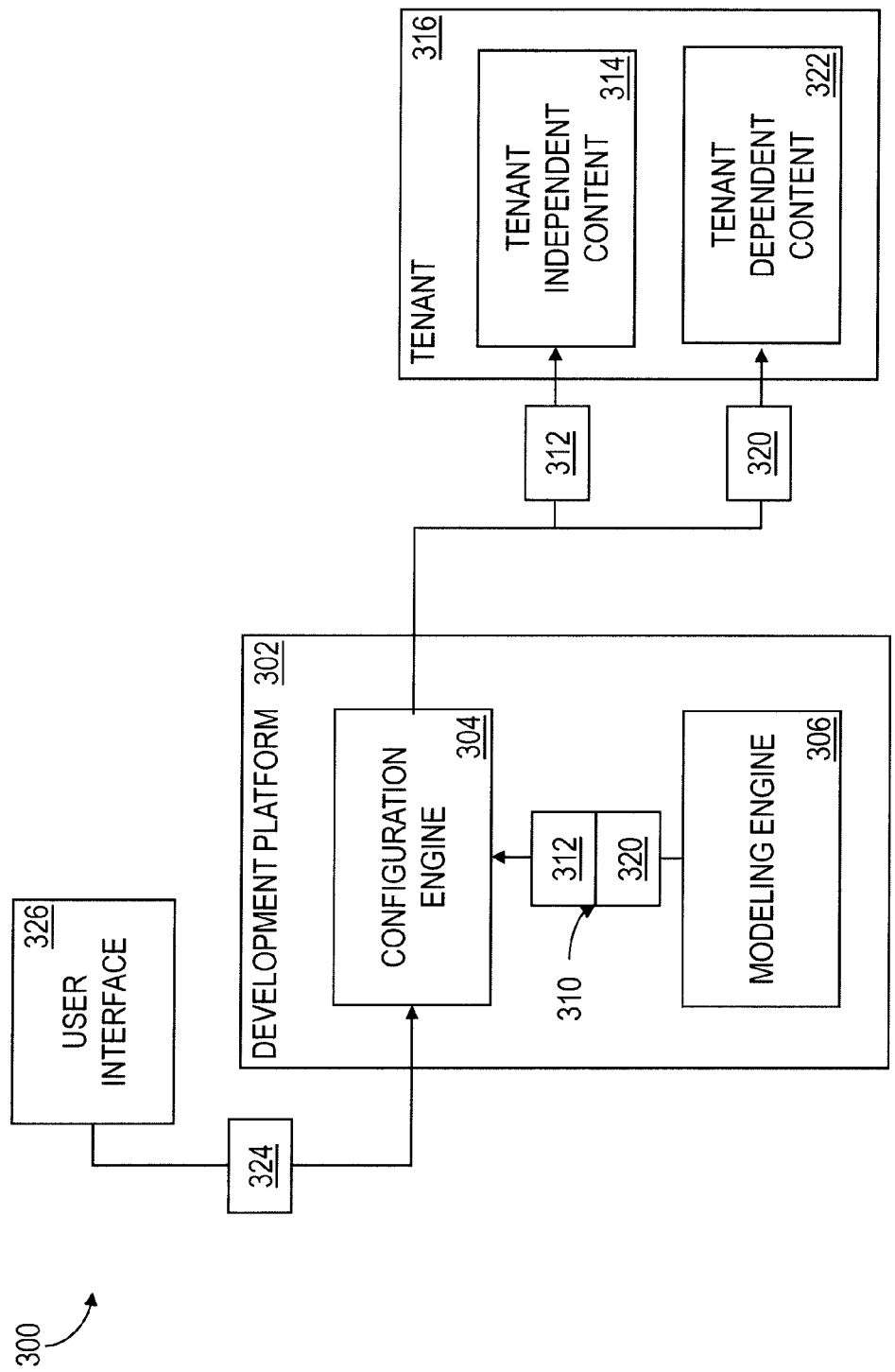
FIG. 3 is a diagram illustrating aspects of a system architecture.

FIG. 3 shows a diagram of a system 300 for developing customized instances of software using a software development platform 302 that can be implemented on one or more programmable processors. The software development platform 302 includes a configuration engine 304 and can also include a modeling engine 306. The configuration engine 304 and modeling engine 306 are shown in FIG. 3 as part of a single software development platform. However, it is within the scope of the current subject mater for the modeling engine 306 to be part of a modeling platform that is separate from the software development platform that includes the configuration engine 304. If implemented on separate platforms, the configuration engine 304 and modeling engine 306 can be in communication over a network, for example a local area network, a wide area network, a cellular network, the Internet, the like and/or any combinations thereof.

The configuration engine 304 can extract parameters 310 characterizing a customized software instance that has been prepared, for example by a developer, using the modeling engine 306. The parameters can include a first part 312 that relates to tenant-independent content or features 314 of a tenant 316 via which the customized software instance is to be provided to end users at an organization, and a second part 320 that relates to tenant-dependent content or features 322 of the tenant 320. The term "tenant" as used herein refers to a software solution that is tailored for users of an organization. The tenant can in some implementations be hosted on a dedicated computing system including one or more programmable processors. Alternatively, as discussed in greater detail below, a tenant can be hosted by a computing system that hosts a plurality of tenants. Such a computing system can include one or more programmable processors. Tenant of the plurality of tenants can provide customized software instances of a core software platform such that each of the tenants and its customizations are accessible only to one organization of potentially multiple organizations having access to the computing system.

The configuration engine can receive tenant-specific implementation input 324, for example from a user interface 326 via which a developer can interact with the configuration engine 302. The tenant-specific implementation input 324 can include instructions for implementing the second part 320 of the parameters 310 for the tenant 316 in accordance with the customized software instance.

Figure 4:
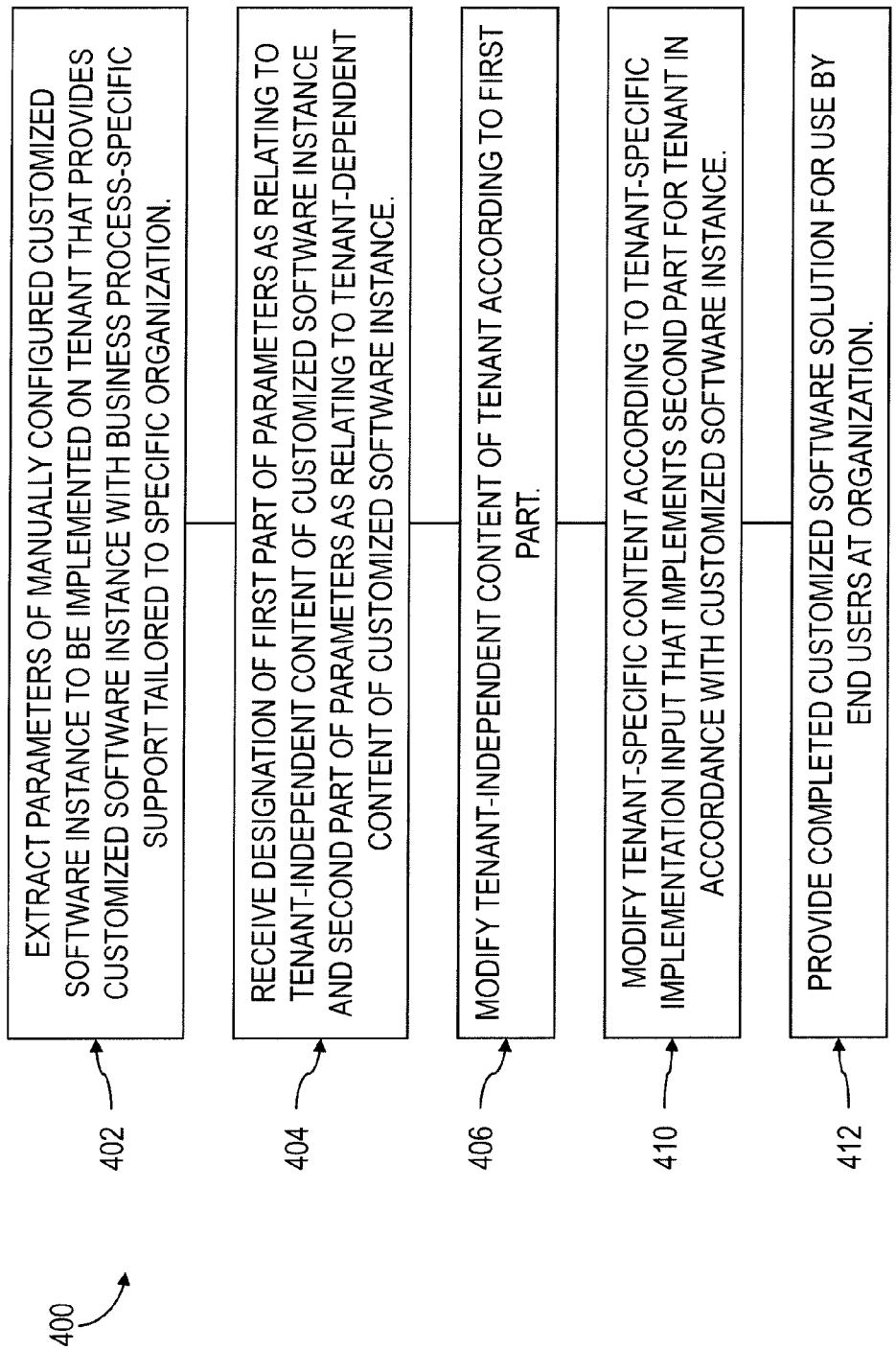
FIG. 4 is a process flow diagram illustrating aspects of a method.

FIG. 4 shows a process flow chart 400 illustrating a method consistent with implementations of the current subject matter. At 402, a configuration engine 302 of a software development platform, that can be implemented on one or more programmable processors, extracts parameters of a manually configured customized software instance to be implemented on a tenant from a modeling engine 304. The tenant 316 provides the customized software instance with business process-specific support tailored to a specific organization. At 404, the configuration engine 302 receives a designation of a first part of the parameters as relating to tenant-independent content of the customized software instance and a second part of the parameters as relating to tenant-dependent content of the customized software instance. The tenant-independent content relates to features of a core software platform and the tenant-dependent content relating to at least one organization-specific extension of the core software platform that provides the business process-specific support, the tenant-dependent content having tenant-specific content formats and tenant-specific content data defined by and available to only the tenant 316. At 406 the configuration engine 302 modifies the tenant-independent content of the tenant 316 according to the first part 312 of the parameters 310. At 410, the configuration engine 302 modifies the tenant-specific content 322 according to tenant-specific implementation input 324 received at the configuration engine 302. The implementation input includes instructions for implementing the second part 320 of the parameters 310 for the tenant 316 in accordance with the customized software instance. The completed customized software solution is provided for use by end users at the organization at 412.

Infrastructures that might need to be updated or reconfigured or that might require an entirely new configuration as part of new versions of the roll-out of new versions of the core software platform on a multi-tenant software architecture can include meta data repository frameworks, such as for example MDRS and xRepository. Both a meta data repository framework as well as the contents of such a framework can be fully integrated into design time. Changes can be delivered as part of a main interface software component, that can in some implementations be provided in the advanced business application programming (ABAP) language. Such changes can be applied using one or more software deployment tools, such as service provisioning and account management (SPAM), which can in some examples be implemented in an ABAP environment.

Figure 5:
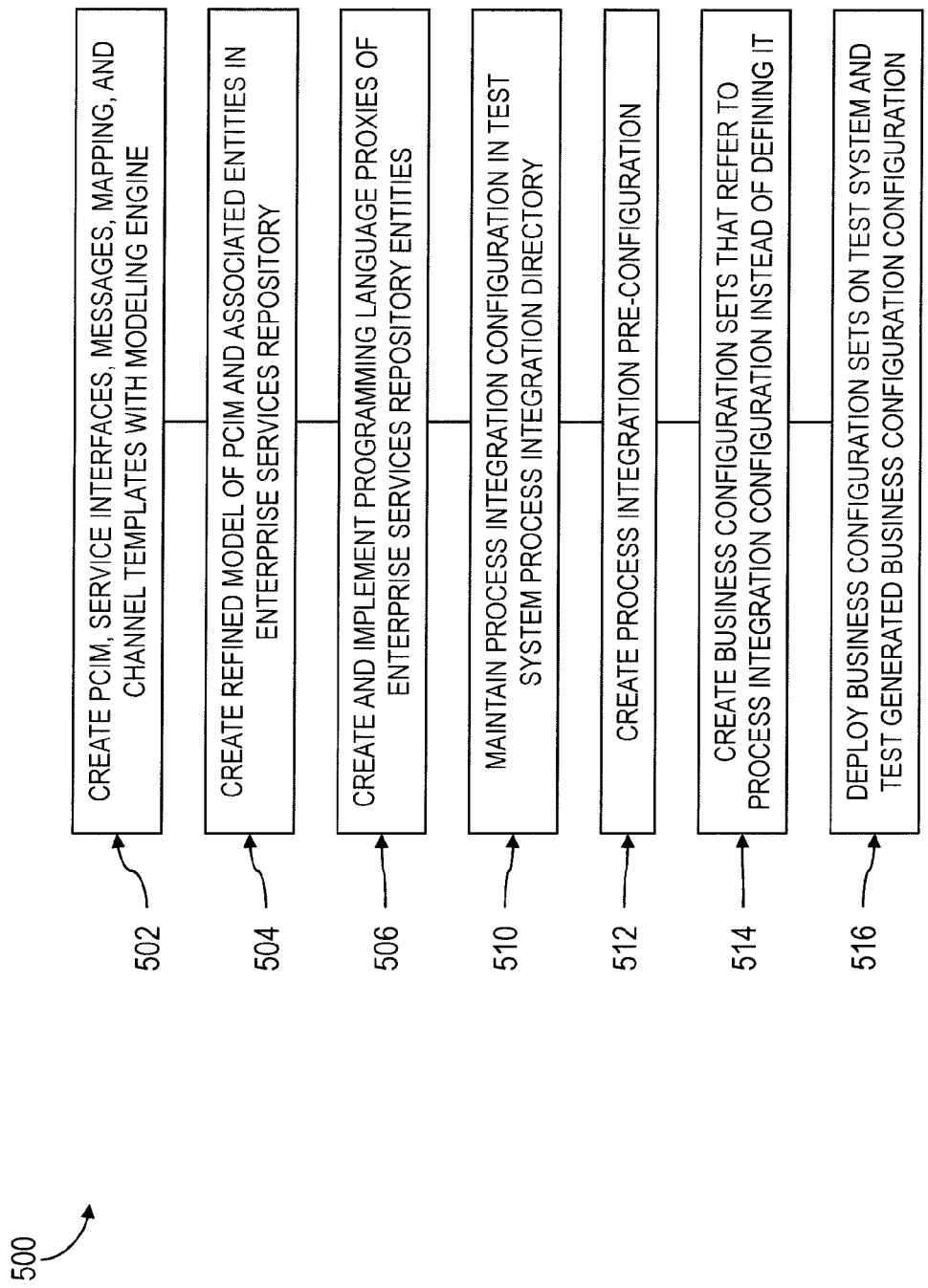
FIG. 5 is a process flow diagram illustrating additional aspects of a method.

FIG. 5 shows a process flow chart 500 illustrating additional possible features of an implementation of the current subject matter. At 502, PCIM, service interfaces, messages, mapping, channel templates, and the like can be created for an in-development customized software platform. The modeling can be done in some implementations by an ARIS expert. At 504, a refined model of PCIM and its associated modeling entities can be created, for example in an ESR by an enterprise services repository expert. The developer can, at 506, create programming language (i.e. ABAP) proxies of the ESR entities and implement them. A process integration configuration can be maintained in a test system process integration directory at 510 while a process integration pre-configuration representing the new process integration configuration of the in-development customized software platform is created at 512. At 514, a content developer can create business configuration sets that refer to the process integration pre-configuration rather than defining it. In this manner, the developer remains in control of the overall configuration rather than the content developer. At 516, the business configuration sets can be deployed on a test system, for example by a software tester, to test the business configuration that has been generated by this process.

In further implementations, the current subject matter can also be applied in a software delivery configuration in which services provided to each of multiple organizations are hosted on a dedicated system that is accessible only to that organization. The software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Such an approach can introduce several challenges. Making modifications to the core software platform, for example updating to a new version, implementing a change to the core functionality, or the like, can become a complicated and unpredictable process if each tenant's customized data objects and other tenant-specific configurations do not react in the same manner to the modifications. Additionally, during a lifecycle management event, such as for example an upgrade, an update, additions or modifications of features, any re-configuration of the core software platform, or the like, many application specific tasks may have to be executed in a multi-tenant system. One or more of these actions have to run on every business tenant that exists in the multi-tenant system. Development efforts to produce a new configuration or even to modify an existing configuration can be substantial, even in an architecture without organization-specific customizations that are provided via the use of extensions such as customer-specific fields, nodes, business objects, or the like. Extensions such as these can introduce large numbers of organization-specific dependencies that differ for each organization whose customized business solution is hosted from an application server or other such system that supports multiple organizations. Thus, roll-out of a new or modified configuration of the core software platform can give rise to a myriad of potential conflicts or other problems that can thwart even the best-planned development efforts.

To address these and potentially other issues, one or more implementations of the current subject matter provide methods, systems, articles or manufacture, and the like that can, among other possible advantages, provide an improved, automated approach to development and roll-out of new or modified configurations in multi-tenant software delivery architectures.

Figure 6:
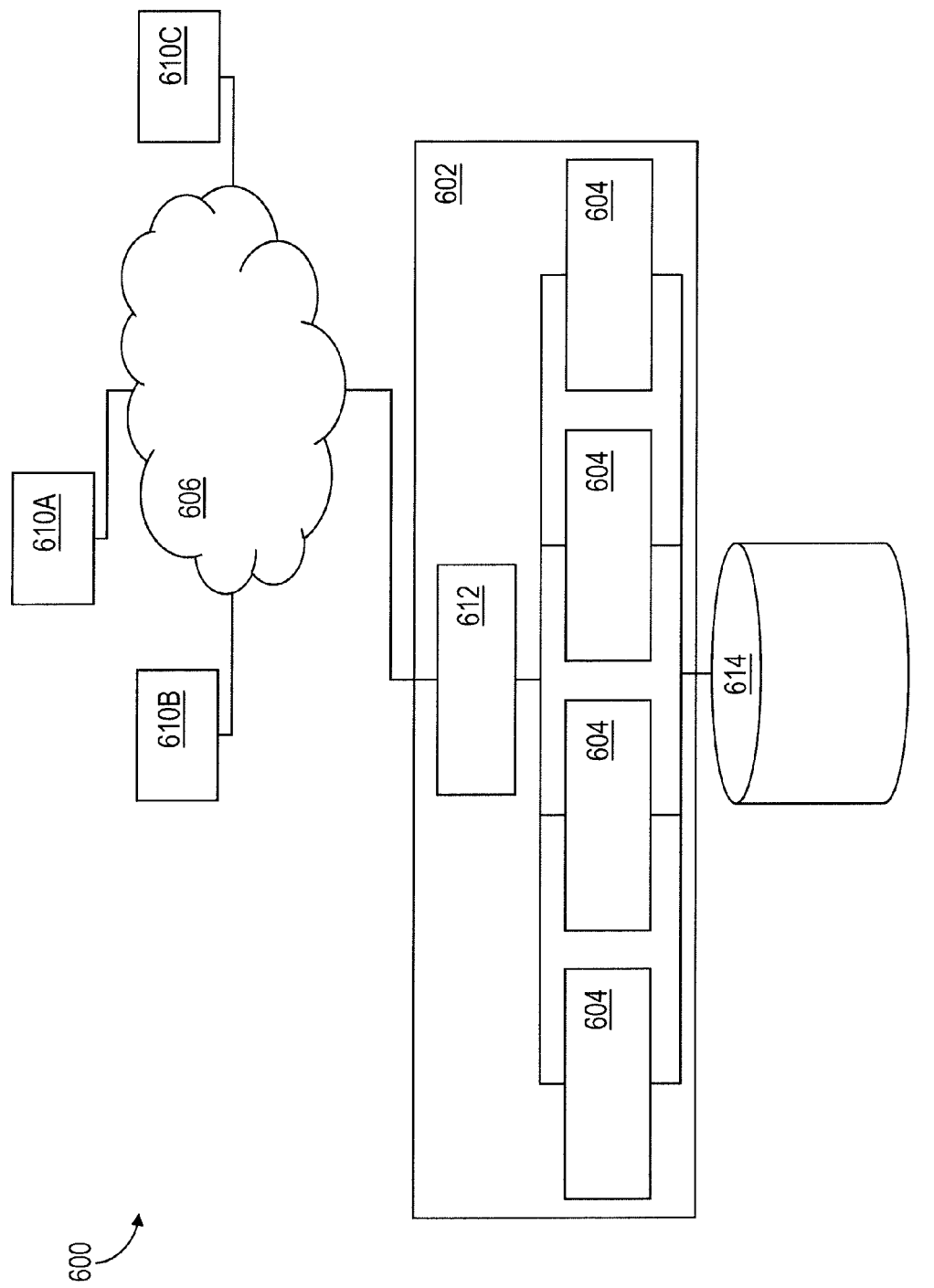
FIG. 6 is a diagram showing an example of a multi-tenant approach to providing customized software services to multiple organizations from a single architecture.

FIG. 6 shows a block diagram of a multi-tenant implementation of a software delivery architecture 600 that includes an application server 602, which can in some implementations include multiple server systems 604 that are accessible over a network 606 from client machines operated by users at each of multiple organizations 610A-610C (referred to herein as "tenants" of a multi-tenant system) supported by a single software delivery architecture 600. For a system in which the application server 602 includes multiple server systems 604, the application server can include a load balancer 612 to distribute requests and actions from users at the one or more organizations 610A-610C to the one or more server systems 604. A user can access the software delivery architecture across the network using a thin client, such as for example a web browser or the like, or other portal software running on a client machine. The application server 602 can access data and data objects stored in one or more data repositories 614.

Figure 7:
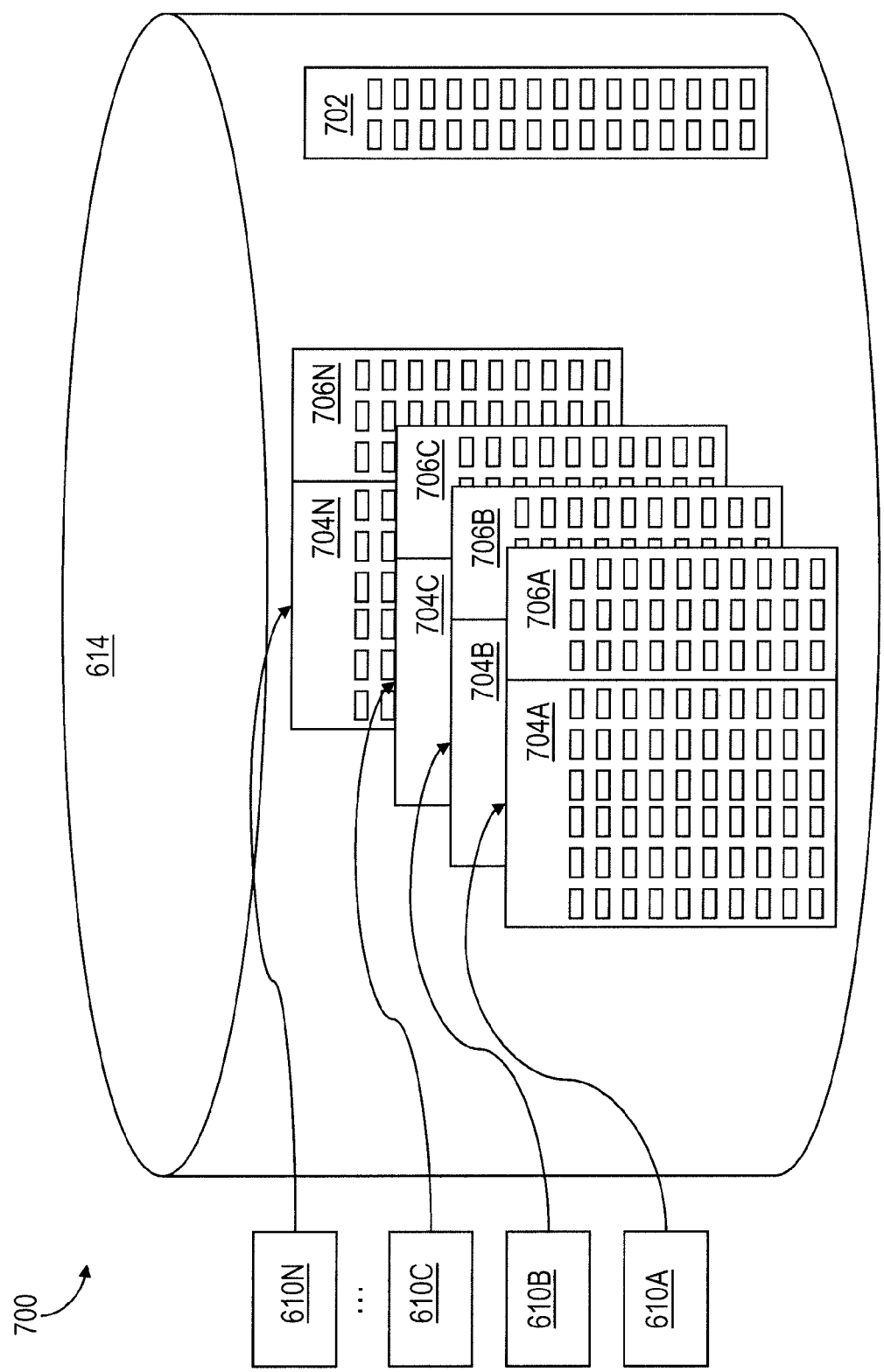
FIG. 7 is a diagram showing storage of both core software package data objects and tenant-specific data objects for each of multiple tenants of a multi-tenant system.

To provide for customization of the core software platform for each of multiple organizations supported by a single software delivery architecture 600, the data and data objects stored in the repository or repositories 614 that are accessed by the application server 602 can include three types of content as shown in FIG. 7: core software platform content 702, system content 704, and tenant content 706. Core software platform content 702 includes content that represents core functionality and is not modifiable by a tenant. System content 704 can in some examples be created by the runtime of the core software platform and can include core data objects that are modifiable with data provided by each tenant. For example, if the core software platform is an ERP system that includes inventory tracking functionality, the system content 704A-704N can include data objects for labeling and quantifying inventory. The data retained in these data objects are tenant-specific: for example, each tenant 610A-610N stores information about its own inventory. Tenant content 706A-706N includes data objects or extensions to other data objects that are customized for one specific tenant 610A-610N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 706 can include condition records in generated condition tables, access sequences, price calculation results, or any other tenant-specific values. A combination of the software platform content 702 and system content 704 and tenant content 706 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 602 that includes multiple server systems 604 that handle processing loads distributed by a load balancer 612. Potential benefits from such an arrangement can include, but are not limited to, high and reliably continuous application server availability and minimization of unplanned downtime, phased updating of the multiple server systems 604 to permit continuous availability (one server system 604 can be taken offline while the other systems continue to provide services via the load balancer 612), scalability via addition or removal of a server system 604 that is accessed via the load balancer 612, and de-coupled lifecycle processes (such as for example system maintenance, software upgrades, etc.) that enable updating of the core software independently of tenant-specific customizations implemented by individual tenants.

The current subject matter can streamline the development process in a multi-tenant system, particularly by enabling separate implementation instruction sets for modification of tenant-dependent content by separating extracted parameters into a first part relating to tenant-independent content and a second part relating to tenant-dependent content.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a machine-readable medium storing instructions that, when executed by at least one processor, cause the at least one processor to perform operations comprising:

extracting, by a configuration engine of a software development platform from a modeling engine, parameters of a manually configured customized software instance to be implemented on a tenant for providing the customized software instance supporting process-specific operations tailored to a specific organization; the tenant being hosted on a computing system including one or more programmable processors and being accessible for use by members of the specific organization;

receiving, by the configuration engine, a designation of a first part of the parameters as relating to tenant-independent content of the customized software instance and a second part of the parameters as relating to tenant-dependent content of the customized software instance, the tenant-independent content relating to features of a core software platform and the tenant-dependent content relating to at least one organization-specific extension of the core software platform providing the business process-specific support, the tenant-dependent content having at least one tenant-specific content format and tenant-specific content data defined by and available to only the tenant;

modifying the tenant-independent content of the tenant according to the first part;

modifying the tenant-specific content according to tenant-specific implementation input that implements the second part for the tenant in accordance with the customized software instance; and providing the customized software solution for use by end users at the organization.

2. A computer program product as in claim 1, wherein the operations further comprise:

receiving, via a user interface provided at a developer's machine, a feature of the customized software instance that is manually configured by the developer; and performing a consistency check on the feature before extracting the parameters by the configuration engine, the consistency check testing suitability of the parameters with the core software platform and with existing tenant-dependent content of the tenant.

3. A computer program product as in claim 1, wherein the tenant-specific implementation input comprises dependency information identifying a first item of tenant-independent content upon which a second item of tenant-specific content has a dependency.

4. A computer program product as in claim 1, wherein the operations further comprise:

creating a refined model of modeling entities for the customized software instance in an enterprise services repository; and creating programming language proxies of the modeling entities for implementation in the customized software instance.

5. A computer program product as in claim 1, wherein the modeling engine and the configuration engine are implemented on an integrated development platform running on a system comprising at least one processor.

6. A computer program product as in claim 1, wherein the tenant is provided by a multi-tenant software architecture providing access to a plurality of tenants that comprises the tenant, the multi-tenant software architecture comprising an application server providing access for each of a plurality of organizations to at least one organization-specific tenant of the plurality of tenants, and a data repository comprising the tenant-independent content that is common to all of the plurality of tenants and tenant-specific content for each of the plurality of organizations, the tenant-specific content for each of the plurality of tenants being accessible to and modifiable by only a corresponding organization of the plurality of organizations.

7. A computer program product as in claim 6, wherein the tenant-independent content comprises at least one of core software platform content that represents core functionality of a core software platform upon which the manually configured customized software instance is based, and system content that is created by the runtime of the core software platform, the core software platform content not being tenant modifiable, the system content comprising a core data object that is modifiable with data provided by the tenant during runtime.

8. A system as in claim 1, wherein the tenant is provided by a multi-tenant software architecture providing access to a plurality of tenants that comprises the tenant, the multi-tenant software architecture comprising an application server providing access for each of a plurality of organizations to at least one organization-specific tenant of the plurality of tenants, and a data repository comprising the tenant-independent content that is common to all of the plurality of tenants and tenant-specific content for each of the plurality of organizations, the tenant-specific content for each of the plurality of tenants being accessible to and modifiable by only a corresponding organization of the plurality of organizations.

9. A system as in claim 8, wherein the tenant-independent content comprises at least one of core software platform content that represents core functionality of a core software platform upon which the manually configured customized software instance is based, and system content that is created by the runtime of the core software platform, the core software platform content not being tenant modifiable, the system content comprising a core data object that is modifiable with data provided by the tenant during runtime.

10. A system comprising:
at least one processor; and
at least one machine-readable medium storing instructions that, when executed by the at least one processor, cause the at least one processor to perform operations comprising:
extracting, by a configuration engine of a software development platform from a modeling engine, parameters of a manually configured customized software instance to be implemented on a tenant for providing the customized software instance supporting process-specific operations tailored to a specific organization; the tenant being hosted on a computing system including one or more programmable processors and being accessible for use by members of the specific organization;
receiving, by the configuration engine, a designation of a first part of the parameters as relating to tenant-independent content of the customized software instance and a second part of the parameters as relating to tenant-dependent content of the customized software instance, the tenant-independent content relating to features of a core software platform and the tenant-dependent content relating to at least one organization-specific extension of the core software platform that provides the business process-specific support, the tenant-dependent content having tenant-specific content formats and tenant-specific content data defined by and available to only the tenant;
modifying the tenant-independent content of the tenant according to the first part;
modifying the tenant-specific content according to tenant-specific implementation input that implements the second part for the tenant in accordance with the customized software instance; and
providing the customized software solution for use by end users at the organization.

11. A system as in claim 10, wherein the operations further comprise:
receiving, via a user interface provided at a developer's machine, a feature of the customized software instance that is manually configured by the developer; and
performing a consistency check on the feature before extracting the parameters by the configuration engine, the consistency check testing suitability of the parameters with the core software platform and with existing tenant-dependent content of the tenant.

12. A system as in claim 10, wherein the tenant-specific implementation input comprises dependency information identifying a first item of tenant-independent content upon which a second item of tenant-specific content has a dependency.

13. A system as in claim 10, wherein the operations further comprise:
creating a refined model of modeling entities for the customized software instance in an enterprise services repository; and
creating programming language proxies of the modeling entities for implementation in the customized software instance.

14. A computer-implemented method comprising:
extracting, by a configuration engine of a software development platform from a modeling engine, parameters of a manually configured customized software instance to be implemented on a tenant for providing the customized software instance supporting process-specific operations tailored to a specific organization; the tenant being hosted on a computing system including one or more programmable processors and being accessible for use by members of the specific organization;
receiving, by the configuration engine, a designation of a first part of the parameters as relating to tenant-independent content of the customized software instance and a second part of the parameters as relating to tenant-dependent content of the customized software instance, the tenant-independent content relating to features of a core software platform and the tenant-dependent content relating to at least one organization-specific extension of the core software platform that provides the business process-specific support, the tenant-dependent content having tenant-specific content formats and tenant-specific content data defined by and available to only the tenant;
modifying the tenant-independent content of the tenant according to the first part;
modifying the tenant-specific content according to tenant-specific implementation input that implements the second part for the tenant in accordance with the customized software instance; and
providing the customized software solution for use by end users at the organization.

15. A method as in claim 14, further comprising:
receiving, via a user interface provided at a developer's machine, a feature of the customized software instance that is manually configured by the developer; and
performing a consistency check on the feature before extracting the parameters by the configuration engine, the consistency check testing suitability of the parameters with the core software platform and with existing tenant-dependent content of the tenant.

16. A method as in claim 14, wherein the tenant-specific implementation input comprises dependency information identifying a first item of tenant-independent content upon which a second item of tenant-specific content has a dependency.

17. A method as in claim 14, further comprising:
creating a refined model of modeling entities for the customized software instance in an enterprise services repository; and
creating programming language proxies of the modeling entities for implementation in the customized software instance.

18. A method as in claim 14, wherein the modeling engine and the configuration engine are implemented on an integrated development platform running on an integrated system comprising the at least one processor.

19. A method as in claim 14, wherein the tenant is provided by a multi-tenant software architecture providing access to a plurality of tenants that comprises the tenant, the multi-tenant software architecture comprising an application server providing access for each of a plurality of organizations to at least one organization-specific tenant of the plurality of tenants, and a data repository comprising the tenant-independent content that is common to all of the plurality of tenants and tenant-specific content for each of the plurality of organizations, the tenant-specific content for each of the plurality of tenants being accessible to and modifiable by only a corresponding organization of the plurality of organizations.

20. A method as in claim 19, wherein the tenant-independent content comprises at least one of core software platform content that represents core functionality of a core software platform upon which the manually configured customized software instance is based, and system content that is created by the runtime of the core software platform, the core software platform content not being tenant modifiable, the system content comprising a core data object that is modifiable with data provided by the tenant during runtime.

* * * * *